United States Patent
Böhm et al.

(10) Patent No.: US 6,536,562 B1
(45) Date of Patent: Mar. 25, 2003

(54) SYSTEM FOR CONTROLLING OR REGULATING AN ELECTROMECHANICAL BRAKE

(75) Inventors: Jürgen Böhm, Oberneisen (DE); Ralf Schwarz, Darmstadt (DE)

(73) Assignee: Continental Teves AG & Co., OHG, Frankfurt (DE)

( * ) Notice: Subject to any disclaimer, the term of this patent is extended or adjusted under 35 U.S.C. 154(b) by 0 days.

(21) Appl. No.: 09/462,996

(22) PCT Filed: Jul. 10, 1998

(86) PCT No.: PCT/EP98/04307

§ 371 (c)(1),
(2), (4) Date: May 4, 2000

(87) PCT Pub. No.: WO99/03714

PCT Pub. Date: Jan. 28, 1999

(30) Foreign Application Priority Data

Jul. 14, 1997 (DE) .......................... 197 30 094

(51) Int. Cl.$^7$ .......................... F16D 65/36; B60T 15/14
(52) U.S. Cl. .......................... 188/156; 188/71.7; 303/20
(58) Field of Search .......................... 303/3, 20; 701/70; 188/1.11 E, 1.11 L, 1.11 W, 1.11 R, 181 T, 181 R, 182, 196 R, 71.7, 71.8, 156, 158

(56) References Cited

U.S. PATENT DOCUMENTS

| | | | | |
|---|---|---|---|---|
| 4,546,296 A | * | 10/1985 | Washbourn et al. | 188/162 |
| 4,602,702 A | * | 7/1986 | Ohta et al. | 188/106 P |
| 4,658,939 A | * | 4/1987 | Kircher et al. | 180/197 |
| 4,941,553 A | * | 7/1990 | Harrison | 188/156 |
| 4,995,483 A | * | 2/1991 | Moseley et al. | 188/162 |
| 5,293,517 A | * | 3/1994 | Andruet | 307/9.1 |
| 5,302,009 A | * | 4/1994 | Menard | 303/150 |
| 5,366,280 A | * | 11/1994 | Littlejohn | 188/1.11 L |
| 6,000,507 A | * | 12/1999 | Bohm et al. | 188/1.11 E |
| 6,003,640 A | * | 12/1999 | Ralea | 188/1.11 L |
| 6,008,604 A | * | 12/1999 | Maisch | 188/157 |
| 6,178,369 B1 | * | 1/2001 | Bohm | 701/70 |
| 6,238,011 B1 | * | 5/2001 | Heckmann | 188/71.7 |
| 6,279,694 B1 | * | 8/2001 | Bohm et al. | 188/162 |

FOREIGN PATENT DOCUMENTS

| | | |
|---|---|---|
| DE | 44 24 270 | 1/1995 |
| DE | 195 26 645 | 1/1997 |
| DE | 195 36 694 | 4/1997 |
| DE | 195 36 695 | 4/1997 |
| EP | 703 133 | 3/1996 |
| WO | WO-9712793 A1 * | 4/1997 |

* cited by examiner

Primary Examiner—Matthew C. Graham
Assistant Examiner—Melody M. Burch
(74) Attorney, Agent, or Firm—Rader, Fishman & Grauer PLLC

(57) ABSTRACT

With electromechanically or electromotively operated brakes, adjusting a clearance presents a problem because with this type of brakes self-actuating reset means of the type provided for hydraulic brakes cannot be used. For adjustment, a neutral position of the actuator must first be determined in which at least one of the friction linings is in close proximity. To this end, the present invention provides for the change in the actuator current ($I_{Akt}$), the change in the actuator position ($\phi_{Akt}$), and the rigidity of the system as derived from the actuator force as a function of actuator position to be evaluated so as to determine the contact.

10 Claims, 3 Drawing Sheets

SYSTEM FOR CONTROLLING OR REGULATING AN ELECTROMECHANICAL BRAKE

TECHNICAL FIELD

The present invention relates to a method of controlling or regulating a brake.

BACKGROUND OF THE INVENTION

A method of this type and a system is disclosed in German published patent application No. 195 26 645, for example. With this prior art method, data about the brake torque acting or the brake force acting and about at least one of the signals introduced into the actuator are sensed to determine the point of contact of the brake linings.

One disadvantage of the prior art method for determining the point of contact is, however, the use of expensive force sensors to determine the brake torques or brake forces. Further, it is known that force sensors have offset fluctuations and/or a zero point drift which are caused, for example, by aging, temperature effects, or overload.

Therefore, an object of the present invention is to provide a method of controlling or regulating which permits detecting and adjusting the clearance by employing parameters which are related to the actuator without requiring an information about the brake torque acting or the brake force acting. Another object of the present invention is to provide a controlling or regulating system for detecting and readjusting the clearance which operates independently of a special brake actuation and, in addition, permits readjusting the clearance also during travel of the automotive vehicle.

This object is achieved by the method of the present invention because to determine the contact making, the rigidity of the system on the side of the actuator is determined as a derivative of the actuator torque or the actuator force plotted against the actuator position.

More specifically, the idea of the present invention arranges for the actuator-side system rigidity to be monitored as to whether its value exceeds or falls below a threshold value.

The use of the quantity of system rigidity has the following advantages over the generic method:

a) The quantity 'system rigidity' can be used both in the initialisation phase (that is when newly adjusting the clearance after start-up of the vehicle, for example) and during actuation of the brake in a braking operation to determine the point of contact, it is also appropriate to readjust the clearance during each braking operation.

b) The analysis of the system rigidity does not require switching between the two operating modes of the power output unit, i.e. 'speed-controlled' and 'torque-controlled', because the excitation signal during the detection does not have to be a constant torque.

A controlling and regulating system for implementing the above-mentioned method is characterized in that a) there is provision of a controller which can be switched between a first and a second control mode, and to which are sent, as input quantities, signals representative of a nominal value and an actual value of a force or a torque desired during actuation of the brake, a signal representative of the nominal actuator position, a contact signal representative of the contact making of the first friction surface on the second friction surface, as well as a switching variable, and the controller generating a first correcting variable, b) there is provision of a clearance guiding and monitoring module to which are sent, as input quantities, a control variable for activating the clearance detection, and signals which correspond to the current being supplied to the actuator and to the actuator position, and which supplies the signal representative of the nominal actuator position, the switching variable, a second switching variable, and the contact signal, and generates a second correcting variable, c) wherein the first correcting variable and the second correcting variable are sent to a selection circuit which, as a function of the second switching variable, sends one of the two correcting variables to an electronic activating circuit, whose output signal is used to drive the actuator.

The first control mode of the above-mentioned controller favorably corresponds to an actuator position control, while the second control mode corresponds to a brake force/brake torque control or a deceleration control.

According to another embodiment of the subject matter of the present invention, the clearance guiding and monitoring module includes a nominal value generator and a device for detecting the point of contact. The nominal value generator is furnished with the control variable, and the device for detecting the point of contact is furnished, as input quantities, with the signals which correspond to the current being supplied to the actuator and the actuator position, and wherein the nominal value generator generates the signal representative of the nominal actuator position, the first switching variable, the second switching variable and the second correcting variable, and the device for detecting the point of contact generates the signal representative of the contact making of the first friction surface on the second friction surface.

The device for detecting the point of contact preferably includes a first module for signal filtering and compensation of the inertia forces, a second module connected downstream of the first module for determining the actuator-side system rigidity, and a third module for comparing the system rigidity found with the threshold value. It is particularly appropriate when a fourth module is connected in parallel to the first, the second, and the third module for the allowability check, to which fourth module is sent, as an input quantity, the signal representative of the actuator position, and which generates a third switching variable which releases the function of the second and the third module.

DETAILED DESCRIPTION OF THE PREFERRED EMBODIMENTS

The following description relates to an electric spot-type disc brake for better comprehending the principle. However, the method is applicable also in other electrically operated brakes without modification (for example, in an electrically operated drum brake).

The method is based on the fact that for determining the point of contact a contact signal K* is produced in the device for detecting the point of contact, which signal supplies a binary information about whether at least one of the brake linings touches the disc or not. The point of contact represents the actuator position in which the linings bear against the disc without force.

Figure 1:
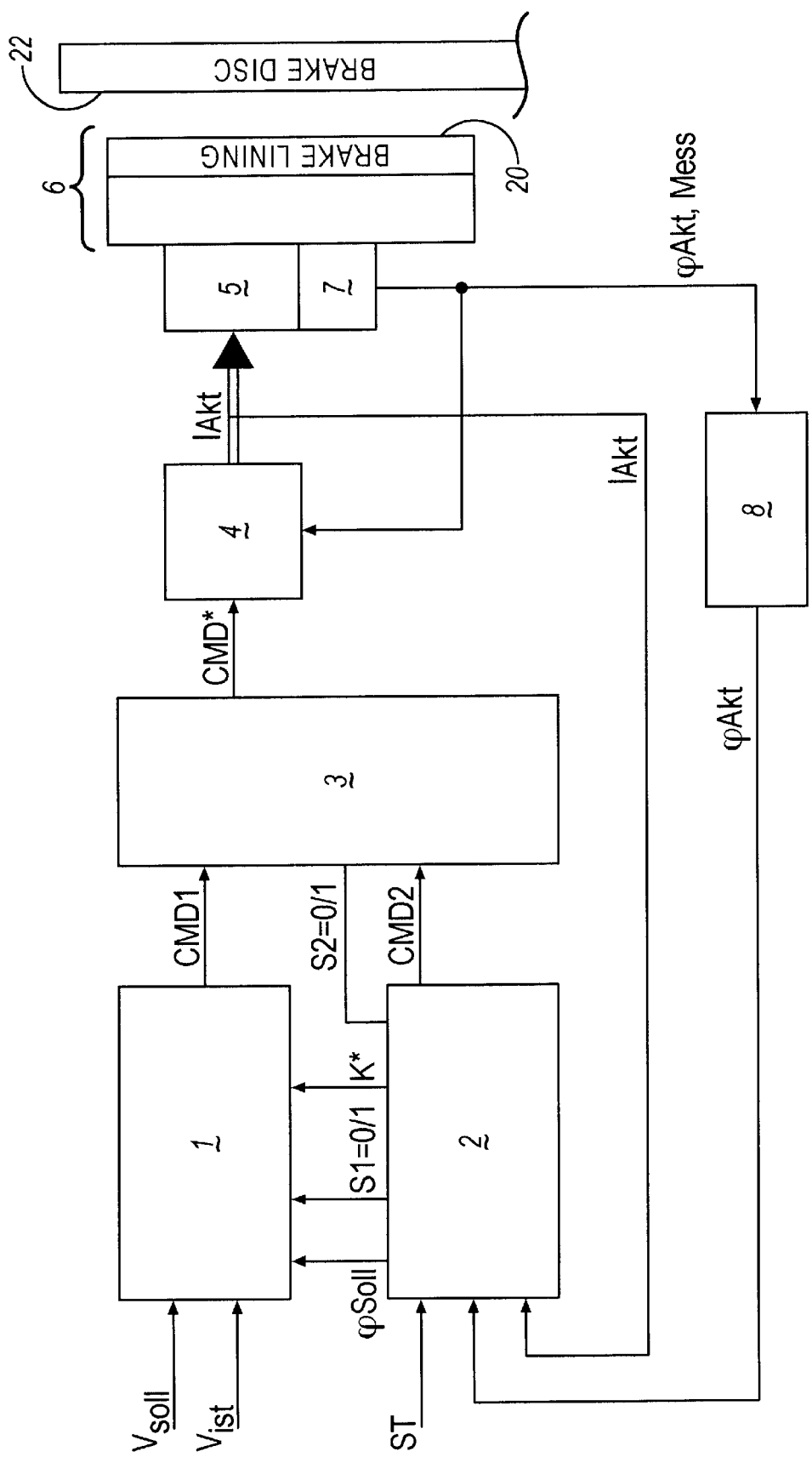
FIG. 1 is a design of a control circuit for implementing the method of the present invention.

The control system illustrated in FIG. 1 is generally comprised of a controller 1, a clearance guiding and monitoring module 2, a selection circuit 3, and a servo booster 4 connected downstream of the selection circuit 3. The output signal $I_{Akt}$ of servo booster 4 is used to drive an (only represented) actuator 5 of an electromechanically operable brake to which is assigned reference numeral 6. Preferably, the actuator is equipped with a position measuring system 7 having an output signal $\phi_{Akt,Mess}$ representative of the actual actuator position which is sent to the servo booster 4, on the one hand, and to a position signal conditioning circuit 8, on the other hand.

Preferably, the controller 1 is configured to be switchable and, therefore, can be operated in a first control mode in which it performs an actuator position control, or in a second control mode in which it performs brake force control, brake torque control or tensional force control. When controller 1 is operated in the second control mode, its nominal input value, $V_{Soll}$, is selected from a set of three possible selections, namely a brake force nominal value, a brake torque nominal value, or a tensional force nominal value, and its actual input value $V_{ist}$ is selected from a set of three possible selections, namely a brake force actual value, a brake torque actual value, or a tensional force actual value. Similarly, when the brake torque actual value is selected by controller 1, the brake torque actual value will be selected as the $V_{ist}$ input. Lastly, when the tensional force nominal value is selected by controller 1, it will also select the tensional force actual value as the $V_{ist}$ input. Signals $\phi_{Soll}$ (representative of the nominal actuator position), $S_1$ (a switching variable), and $K^*$ (the above-mentioned contact signal whose output quantity represents the correcting variable $CMD_1$ which is sent to the selection circuit 3 ) are also input into controller 1. The nominal value $V_{Soll}$ is supplied from a superior level (for example, driver's wish, ABS or ASMS controller), and the actual deceleration value $V_{ist}$ represents a controller feedback quantity. The signal $\phi_{Soll}$ which corresponds to the nominal actuator position and the switching variable $S_1$ are supplied by the clearance guiding and monitoring module 2 whose input quantities represent a control variable ST for the activation of the clearance detection, the output signal $I_{Akt}$ of the servo booster 4 which corresponds to the current being supplied to the actuator 5, and the output signal $\phi_{Akt}$ of the position signal conditioning circuit 8. The output signals of the clearance guiding and monitoring module 2 are a second switching variable $S_2$ which influences the behavior of the selection circuit 3, a second correcting variable $CMD_2$, and the contact signal $K^*$ which is produced upon contact between at least one of the surfaces 20 of brake linings and the brake disc 22.

Figure 2:
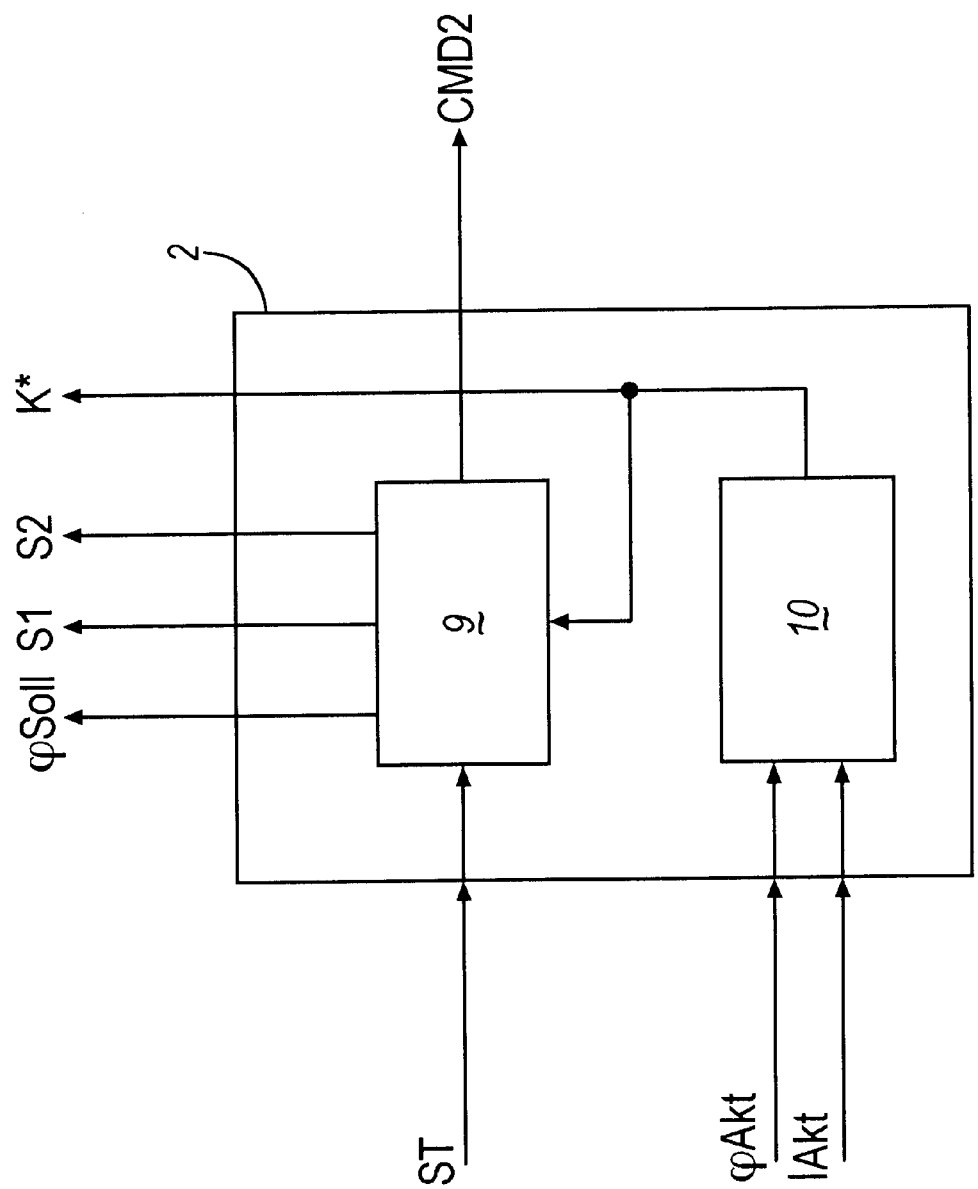
FIG. 2 is a view of the design of the clearance guiding and monitoring module used in the control circuit according to FIG. 1.

As can be seen in FIG. 2 in particular, the clearance guiding and monitoring module 2 includes two function units, that is a nominal value generator 9 and a device for detecting the contact between the brake lining and the brake disc, i.e., the point of contact, referred to by reference numeral 10. The input quantity of the nominal value generator 9 represents the above-mentioned control variable ST which is supplied by a superior function unit (not specified in detail). This variable permits the superior level to initiate procedures for determining, adjusting and readjusting the clearance. Outputs of the nominal value generator 9 are the two switching variables $S_1$ and $S_2$ and the correcting variable $CMD_2$. The switching variable $S_1$ switches the controller 1 between position control and force or torque control. The switching variable $S_2$ either switches the correcting variable $CMD_1$ of the controller 1 or the correcting variable $CMD_2$ of the nominal value generator 9 to the input of the servo booster 4.

The input quantities of the device 10 for detecting the point of contact are the actuator current $I_{Akt}$ and the actuator position $\phi_{Akt}$. Its output is the above-mentioned contact signal $K^*$. On command of this signal, the nominal value generator 9 drafts an actuating strategy for the controller 1 to solve the above-mentioned problem.

The nominal value generator 9 has three operating modes:
1) Clearance Detection for Clearance Initialization This mode is used to determine the clearance in case the absolute position of the position signal of the actuator is unknown or must be determined anew. For example, this may be the case when the brake linings and/or the disc have been exchanged of when a new adjustment of the clearance is required after the vehicle has been turned off. The mode is triggered by way of the control variable ST. When the nominal value generator 9 assumes this operating mode, the switching variable $S_2$ is initially set to '1'. Thus, the output signal $CMD_2$ of the clearance guiding and monitoring module 2 is sent to the activation unit of the brake 6. The correcting variable $CMD_1$ of the controller 1 remains without effect. When implementing the strategy for the clearance adjustment, the correcting variable $CMD_2$ is not intended to represent a constant actuator torque.

Rather, it is appropriate to calculate the correcting variable $CMD_2$ from the actuator torque and the actuator speed, and a constant input P can e.g. be predetermined. This is possible by predefining $CMD_2$ so that $P = M_{Akt} \cdot \phi_{Akt}$, and $M_{Akt}$ can be determined from the electric input quantities of the actuator ($M_{Akt}$ is proportional to the actuator current $I_{Akt}$ in many types of actuators).

When it is found out by way of the position signal $\phi_{Akt}$ that the brake is aerated, i.e., that a clearance exists, the contact signal $K^*$ will be monitored. When it switches over to '1', this means that at least one of the linings is in abutment with the brake disc, and the nominal value generator 9 is caused to assume the mode 3)—clearance adjustment—which will be explained in the following.

When it is found out by way of the position signal $\phi_{Akt}$ that the brake has already been applied, $S_2$ will be set to '0', and the controller 1 is switched to the position control mode by setting the switching variable $S_1$ to '1'. The brake 6 is slightly withdrawn, and the procedure of the above-described clearance detection for clearance initialization starts again.

2) Clearance Detection in Braking Operations

The clearance changes due to most different influences (for example, lining expansion due to heating, lining abrasion due to wear, etc.) during braking operations. However, it is unfavorable to carry out a clearance initialisation during driving because such an initialization, based on actuator signals, always induces a movement of one frictional partner into contact with the other one (associated with low brake torque). Therefore, it is desirable to readjust the clearance during braking operations initiated by the driver or any superior control system. For this purpose, the nominal value generator 9 is switched to the mode 2) before a braking operation commences. In this mode, the controller 1 or a superior level observes the contact signal $K^*$ which, when switched from '0' to '1', causes a new initialisation of the absolute position $\phi_0$. When it is desired to adjust the clearance (mode '3'), the actual absolute position is taken into account in the calculation of the nominal position for the clearance.

3) Clearance Adjustment

The third mode—clearance adjustment—serves to adjust the clearance after a clearance detection in the mode '1' has been completed with success or after a braking operation is terminated. The nominal value generator 9 switches the controller 1 by way of the switching variable $S_1=1$ into the position control mode for this purpose. By way of the switching variable $S_2=0$, the nominal value generator 9 causes the output signal $CMD_1$ of the controller 1 to prevail at the input of the servo booster 4. The controller 1 is informed about the position nominal value for the clearance by means of the output signal $\phi_{Soll}$ of the nominal value generator 9. This position nominal value is calculated from the absolute zero position $\phi_0$ (initialization or adaption by way of contact signal K*) and the previously determined clearance $\phi_{LS}$. Thus, $\phi_{Soll}=\phi_0-\phi_{LS}$ results for the position nominal value signal.

Figure 3:
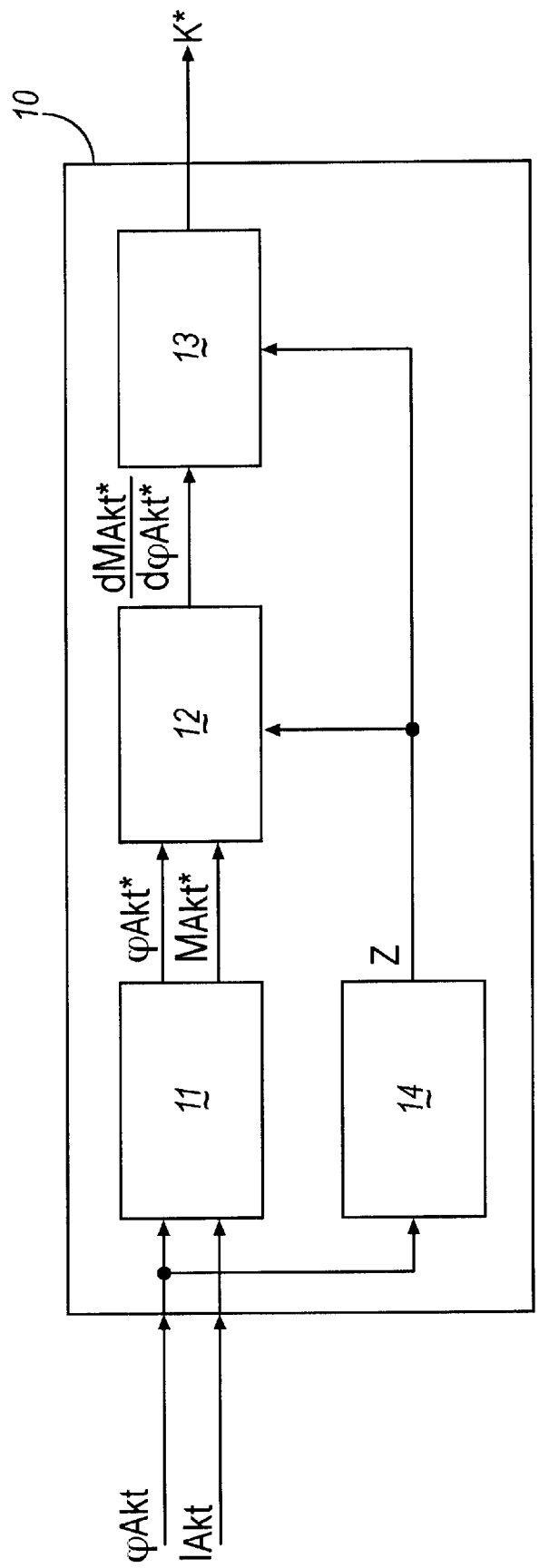
FIG. 3 is a view of the device for detecting the point of contact which is used in the control circuit according to FIG. 1.

The embodiment of FIG. 3 shows the design of the device 10 for detecting the point of contact which was mentioned with respect to FIG. 2. As can be seen in the schematic representation, the device is basically composed of four modules. The first module 11 is used for the signal conditioning, that means, the signal filtering and the compensation of the inertia forces which occur in the system. The input quantities, i.e. actuator torque (or a proportional quantity—herein: actuator current $I_{Akt}$) and actuator angle $\phi_{Akt}$ are initially filtered in a low-pass filter to remove disturbances. A so-called Bessel filter is preferably employed which causes a constant phase shift of the filtered signals. Subsequently, the actuator torque $M_{Akt}$ is calculated in this module 11 from the input signal $I_{Akt}$ which is proportional to the actuator torque. The compensation of the inertia moments 'purifies' the actuator torque signal $M_{Akt}$ from the total mass inertia moments of the brake which must be accelerated by the actuator 5. This is necessary because only the actuator torque for the generation of the actuating force (clamping of the frictional partners) and the friction torque are relevant for the calculation of the actuator-side system rigidity. Thus, the filtered actuator position signal $\phi_{Akt}^*$ and the filtered actuator torque signal $M_{Akt}^*$ corrected by the inertia moments are output quantities of this module 1.

The actuator-side system rigidity is established and/or calculated in the second module 12. The quotient $dM_{Akt}^*/d\phi_{Akt}^*$ is referred to by the term actuator-side system rigidity. It is achieved by the derivative of the actuator torque plotted against the actuator angle that a position-responsive rise of the actuator torque (as it occurs when one frictional partner moves into abutment on the other frictional partner) rather than a rise in time is illustrated. The advantage is that the timely variation of the movement of the brake 6 for the signal $dM\phi_{Akt}^*/d\phi_{Akt}^*$ observed for the contact detection is not relevant. Therefore, the variation of the signal 'motor-side system rigidity' is independent of the rate of speed at which the brake 6 is applied.

The third module 13 generates the contact signal K* by comparison of the quotient $dM_{Akt}^*/d\phi_{Akt}^*$ with a threshold value SW. The signal is set to the value '1', for example, when the threshold value is exceeded, and it is set to '0' when the threshold value SW falls below.

The fourth module 14 which is connected in parallel to the modules 11–13 and to which is sent, as an input quantity, the signal pat which corresponds to the actuator position checks by way of various conditions whether the generation of the contact signal K* at the instantaneous point of time is suitable or allowable and whether the contact signal K* per se is valid. When the contact signal K* is valid, the fourth module 14 causes this contact signal to appear at the output of the device 10 by setting a switching variable Z=1 and releases the calculation of the quotient $dM_{Akt}^*/d\phi_{Akt}^*$ in the second module 12. It is prevented by the use of the third variable Z that, e.g. in the inoperative condition of the brake ($d\phi_{Akt}^*=0$), there occurs an invalid output signal or an invalid operation (for example, division by '0').

As has already been explained hereinabove, the actuator position $\phi_{Akt}$ is provided as an input for checking various plausibility conditions in FIG. 3. However, it is possible that still other signals are taken into account for the allowability check.

What is claimed is:

1. Method of regulating a brake, including a first friction surface which is electrically manipulatable against a second friction surface by means of an actuator, wherein a clearance resides between said first and second friction surfaces, means for sensing directly or indirectly an actuator current as well as a position of the actuator, and a device which detects contact between the first friction surface and the second friction surface and subsequently generates a contact signal, wherein the change in the actuator current ($I_{Akt}$) and the change in the actuator position ($\phi_{Akt}$) are evaluated for detecting the contact making, and an actuator torque ($M_{Akt}$) or an actuator force ($F_{Akt}$), respectively, is associated with the actuator current ($I_{Akt}$), comprising the steps of:

detecting contact between the first and second friction surfaces by, determining rigidity of the system on a side of the actuator as a derivative of at least one of the actuator torque ($M_{Akt}$) or the actuator force ($F_{Akt}$) as a function of the actuator position ($\phi_{Akt}$).

2. Method as claimed in claim 1, further including the steps of monitoring that the actuator-side system rigidity as to whether its value exceeds or falls below a threshold value (SW).

3. Method as claimed in claim 1, further including the step of adjusting the clearance $\phi_{LS}$) based on the actuator position $\phi_{Akt}$) which corresponds to the point of contact.

4. Method as claimed in claim 3, further including the step of adjusting the clearance ($\phi_{LS}$) is adjusted by means of a controller which changes the actuator position $\phi_{Akt}$).

5. Method as claimed in claim 1, further including the step of detecting the contact making during a defined movement of the first friction surface against the second friction surface.

6. Method as claimed in claim 1, further including the step of detecting the contact making during actuation of the brake.

7. Method as claimed in claim 5, further including the step of driving the actuator so as to provide a constant mechanical output.

8. Method as claimed in claim 5, further including the step of driving the actuator by a defined current value ($I_{Akt,Soll}$).

9. Method as claimed in claim 5, further including the step of driving the actuator with a defined actuator speed $\omega_{Akt,Soll}$).

10. Method as claimed in claim 5, further including the step of driving the actuator so that the weighted sum of the actuator current $I_{Akt}$) and an actuator speed $\omega_{Akt}$) is constant.

* * * * *

UNITED STATES PATENT AND TRADEMARK OFFICE
CERTIFICATE OF CORRECTION

PATENT NO. : 6,536,562 B1
DATED : March 25, 2003
INVENTOR(S) : Jurgen Bohm et al.

It is certified that error appears in the above-identified patent and that said Letters Patent is hereby corrected as shown below:

Column 6,
Lines 41 and 44, please change "$\phi_{LS}$)" to -- ($\phi_{LS}$) --.
Lines 42 and 45, please change "$\phi_{Akt}$)" to -- ($\phi_{Akt}$) --.
Lines 59-60, please change "$\omega_{Akt,Soll}$)" to -- ($\omega_{Akt,Soll}$) --.
Line 63, please change "$I_{Akt}$)" to -- ($I_{Akt}$) -- and "$\omega_{Akt}$)" to -- ($\omega_{Akt}$) --.

Signed and Sealed this

Second Day of September, 2003

JAMES E. ROGAN
*Director of the United States Patent and Trademark Office*